(12) United States Patent
Karakasis et al.

(10) Patent No.: US 11,078,799 B2
(45) Date of Patent: Aug. 3, 2021

(54) TURBOMACHINE ROTOR BLADE WITH AN AIRFOIL HAVING A VARIABLE ELLIPTICAL TRAILING EDGE

(71) Applicant: General Electric Company, Schenectady, NY (US)

(72) Inventors: Marios Karakasis, Fislisbach (CH); Robert Piotr Bujnicki, Grodzisk Mazowiecki (PL); Adam John Fredmonski, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/695,256

(22) Filed: Nov. 26, 2019

(65) Prior Publication Data

US 2021/0156269 A1    May 27, 2021

(51) Int. Cl.
*F01D 5/30* (2006.01)
*F01D 5/12* (2006.01)

(52) U.S. Cl.
CPC .............. *F01D 5/30* (2013.01); *F01D 5/12* (2013.01); *F05D 2220/32* (2013.01); *F05D 2240/303* (2013.01); *F05D 2240/304* (2013.01); *F05D 2240/305* (2013.01); *F05D 2240/306* (2013.01)

(58) Field of Classification Search
CPC ........ F01D 5/30; F01D 5/12; F05D 2240/304; F05D 2240/305; F05D 2240/306; F05D 2220/32; F05D 2240/303
See application file for complete search history.

(56) References Cited

U.S. PATENT DOCUMENTS

2017/0067347 A1* 3/2017 Kareff ................. F01D 5/22

FOREIGN PATENT DOCUMENTS

DE     102016222789 A1     5/2018
EP        3045663 A1 *    7/2016     ............. F01D 5/141
WO    WO2020/055387 A1    3/2020

OTHER PUBLICATIONS

European Search Report Corresponding to Application No. 20207935 dated Apr. 21, 2021.

* cited by examiner

*Primary Examiner* — Jacob M Amick
*Assistant Examiner* — Charles J Brauch
(74) *Attorney, Agent, or Firm* — Dority & Manning, P.A.

(57) ABSTRACT

A rotor blade of a turbomachine includes an airfoil. The airfoil includes a root and a tip which define a span of the airfoil therebetween. The airfoil also includes a leading edge and a trailing edge downstream of the leading edge along a flow direction. The leading edge and the trailing edge each extend across the span of the airfoil from the root to the tip. The airfoil further includes a pressure side surface and a suction side surface. The pressure side surface and the suction side surface are continuous about the trailing edge and collectively define an arc centered on the trailing edge. The arc has a semi-major axis and a semi-minor axis. The semi-major axis and the semi-minor axis of the arc define an axis ratio, and the axis ratio varies over the span of the airfoil.

20 Claims, 8 Drawing Sheets

TURBOMACHINE ROTOR BLADE WITH AN AIRFOIL HAVING A VARIABLE ELLIPTICAL TRAILING EDGE

FIELD

The present disclosure generally relates to turbomachines. More particularly, the present disclosure relates to rotor blades for turbomachines.

BACKGROUND

A gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The turbine section generally includes a plurality of rotor blades. Each rotor blade includes an airfoil positioned within the flow of the combustion gases. In this respect, the rotor blades extract kinetic energy and/or thermal energy from the combustion gases flowing through the turbine section. The airfoil of the rotor blade typically extends radially outward from a platform to a tip at a radially outer end of the airfoil. Certain rotor blades may include a tip shroud coupled to the radially outer end of the airfoil. The tip shroud reduces the amount of combustion gases leaking past the rotor blade. A fillet may be provided at the transition between the airfoil and the platform and at the transition between the airfoil and the tip shroud.

The airfoil may extend from a leading edge to a trailing edge downstream of the leading edge and may define aerodynamic surfaces therebetween, such as a pressure side surface and a suction side surface. In conventional airfoils, the aerodynamic surfaces proximate the trailing edge of the airfoil may be optimized for aerodynamic properties or may be optimized for structural properties, but generally optimization of one set of properties comes at the expense of the other set of properties.

Accordingly, an airfoil for a rotor blade that provides both robust structural features and efficient aerodynamic performance would be useful.

BRIEF DESCRIPTION

Aspects and advantages of the technology will be set forth in part in the following description, or may be obvious from the description, or may be learned through practice of the technology.

In accordance with one embodiment, an airfoil for a rotor blade is provided. The airfoil includes a root and a tip spaced radially outward from the root. A span of the airfoil is defined between the root and the tip. The airfoil also includes a leading edge extending across the span of the airfoil from the root to the tip and a trailing edge downstream of the leading edge along a flow direction. The trailing edge also extends across the span of the airfoil from the root to the tip. The airfoil further includes a pressure side surface extending between the root and the tip and extending between the leading edge and the trailing edge and a suction side surface extending between the root and the tip and extending between the leading edge and the trailing edge. The suction side surface opposes the pressure side surface. The pressure side surface and the suction side surface are continuous about the trailing edge. The airfoil also includes an arc centered on the trailing edge and collectively defined by a portion of the pressure side surface and a portion of the suction side surface. The arc has a semi-major axis and a semi-minor axis. The semi-major axis and the semi-minor axis of the arc define an axis ratio, and the axis ratio varies over the span of the airfoil.

In accordance with another embodiment, a turbomachine is provided. The turbomachine includes a compressor, a combustor disposed downstream from the compressor, and a turbine disposed downstream from the combustor. The turbine includes a rotor shaft extending along an axial direction through the turbine and a rotor blade connected to the rotor shaft. An airfoil of the rotor blade includes a root and a tip spaced radially outward from the root. A span of the airfoil is defined between the root and the tip. The airfoil also includes a leading edge extending across the span of the airfoil from the root to the tip and a trailing edge downstream of the leading edge along a flow direction. The trailing edge also extends across the span of the airfoil from the root to the tip. The airfoil further includes a pressure side surface extending between the root and the tip and extending between the leading edge and the trailing edge and a suction side surface extending between the root and the tip and extending between the leading edge and the trailing edge. The suction side surface opposes the pressure side surface. The pressure side surface and the suction side surface are continuous about the trailing edge. The airfoil also includes an arc centered on the trailing edge and collectively defined by a portion of the pressure side surface and a portion of the suction side surface. The arc has a semi-major axis and a semi-minor axis. The semi-major axis and the semi-minor axis of the arc define an axis ratio, and the axis ratio varies over the span of the airfoil.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures.

DETAILED DESCRIPTION

Figure 1:
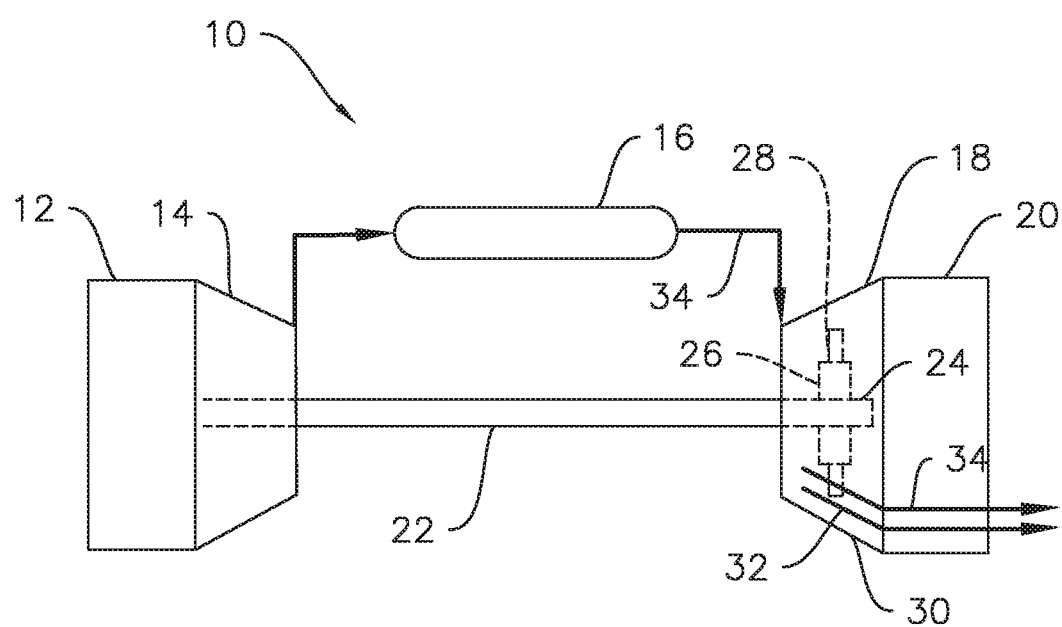
FIG. 1 is a schematic view of an exemplary gas turbine engine, in accordance with embodiments of the present disclosure.

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, terms of approximation, such as "generally" or "about," include values within ten percent greater or less than the stated value. When used in the context of an angle or direction, such terms include values within ten degrees greater or less than the stated angle or direction. For example, "generally vertical" includes directions within ten degrees of vertical in any direction, e.g., clockwise or counter-clockwise.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine, unless otherwise specified in the claims. For example, the technology as described herein may be used in any type of turbomachine including, but not limited to, aviation gas turbines (e.g., turbofans, etc.), steam turbines, and marine gas turbines.

Referring now to the drawings, wherein identical numerals indicate the same elements throughout the figures, FIG. 1 schematically illustrates a gas turbine engine 10. It should be understood that the gas turbine engine 10 of the present disclosure need not be a gas turbine engine, but rather may be any suitable turbomachine, such as a steam turbine engine or other suitable engine. The gas turbine engine 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form the shaft 22.

The turbine section 18 may generally include a rotor shaft 24 having a plurality of rotor disks 26 (one of which is shown) and a plurality of rotor blades 28 extending radially outward from and being interconnected to the rotor disk 26. Each rotor disk 26, in turn, may be coupled to, or may form, a portion of the rotor shaft 24 that extends through the turbine section 18. The turbine section 18 further includes an outer casing 30 that circumferentially surrounds the rotor shaft portion 24 and the rotor blades 28, thereby at least partially defining a hot gas path 32 through the turbine section 18.

During operation, air or another working fluid flows through the inlet section 12 and into the compressor section 14, where the air is progressively compressed to provide pressurized air to the combustors (not shown) in the combustion section 16. The pressurized air mixes with fuel and burns within each combustor to produce combustion gases 34. The combustion gases 34 flow along the hot gas path 32 from the combustion section 16 into the turbine section 18. In the turbine section, the rotor blades 28 extract kinetic and/or thermal energy from the combustion gases 34, thereby causing the rotor shaft 24 to rotate. The mechanical rotational energy of the rotor shaft 24 may then be used to power the compressor section 14 and/or to generate electricity. The combustion gases 34 exiting the turbine section 18 may then be exhausted from the gas turbine engine 10 via the exhaust section 20.

Figure 2:
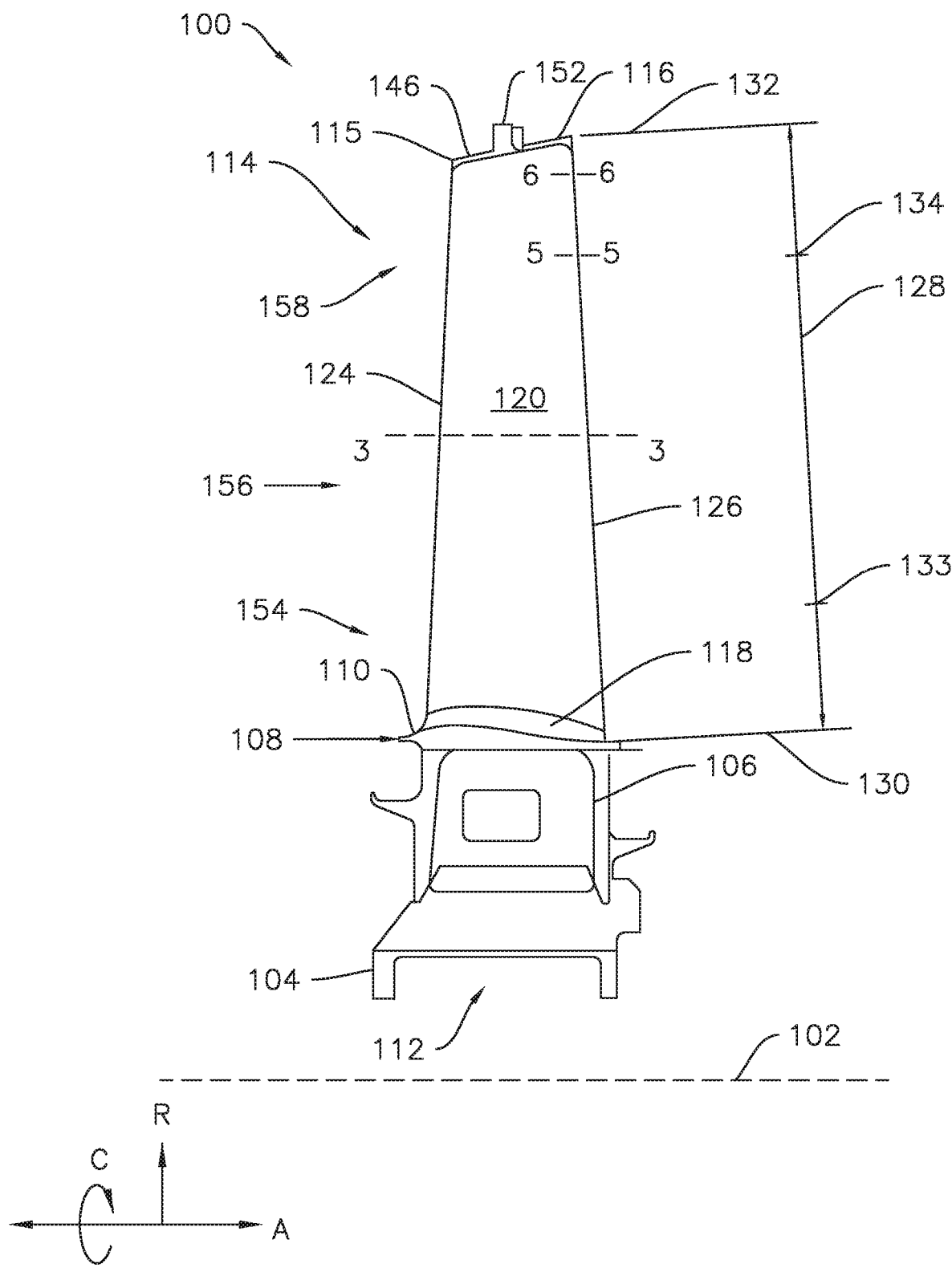
FIG. 2 is a side view of an exemplary rotor blade, in accordance with embodiments of the present disclosure.

FIG. 2 is a view of an exemplary rotor blade 100, which may be incorporated into the turbine section 18 of the gas turbine engine 10 in place of the rotor blade 28. As shown, the rotor blade 100 defines an axial direction A, a radial direction R, and a circumferential direction C. In general, the axial direction A extends parallel to an axial centerline 102 of the shaft 24 (FIG. 1), the radial direction R extends generally orthogonal to the axial centerline 102, and the circumferential direction C extends generally concentrically around the axial centerline 102. The rotor blade 100 may also be incorporated into the compressor section 14 of the gas turbine engine 10 (FIG. 1).

As illustrated in FIG. 2, the rotor blade 100 may include a dovetail 104, a shank portion 106, and a platform 108. More specifically, the dovetail 104 secures the rotor blade 100 to the rotor disk 26 (FIG. 1). The shank portion 106 couples to and extends radially outward from the dovetail 104. The platform 108 couples to and extends radially outward from the shank portion 106. The platform 108 includes a radially outer surface 110, which generally serves as a radially inward flow boundary for the combustion gases 34 flowing through the hot gas path 32 of the turbine section 18 (FIG. 1). The dovetail 104, shank portion 106, and platform 108 may define an intake port 112, which permits cooling fluid (e.g., bleed air from the compressor section 14) to enter the rotor blade 100. In the embodiment shown in FIG. 2, the dovetail 104 is an axial entry fir tree-type dovetail. Alternately, the dovetail 104 may be any suitable type of dovetail. In fact, the dovetail 104, shank portion 106, and/or platform 108 may have any suitable configurations.

Figure 3:
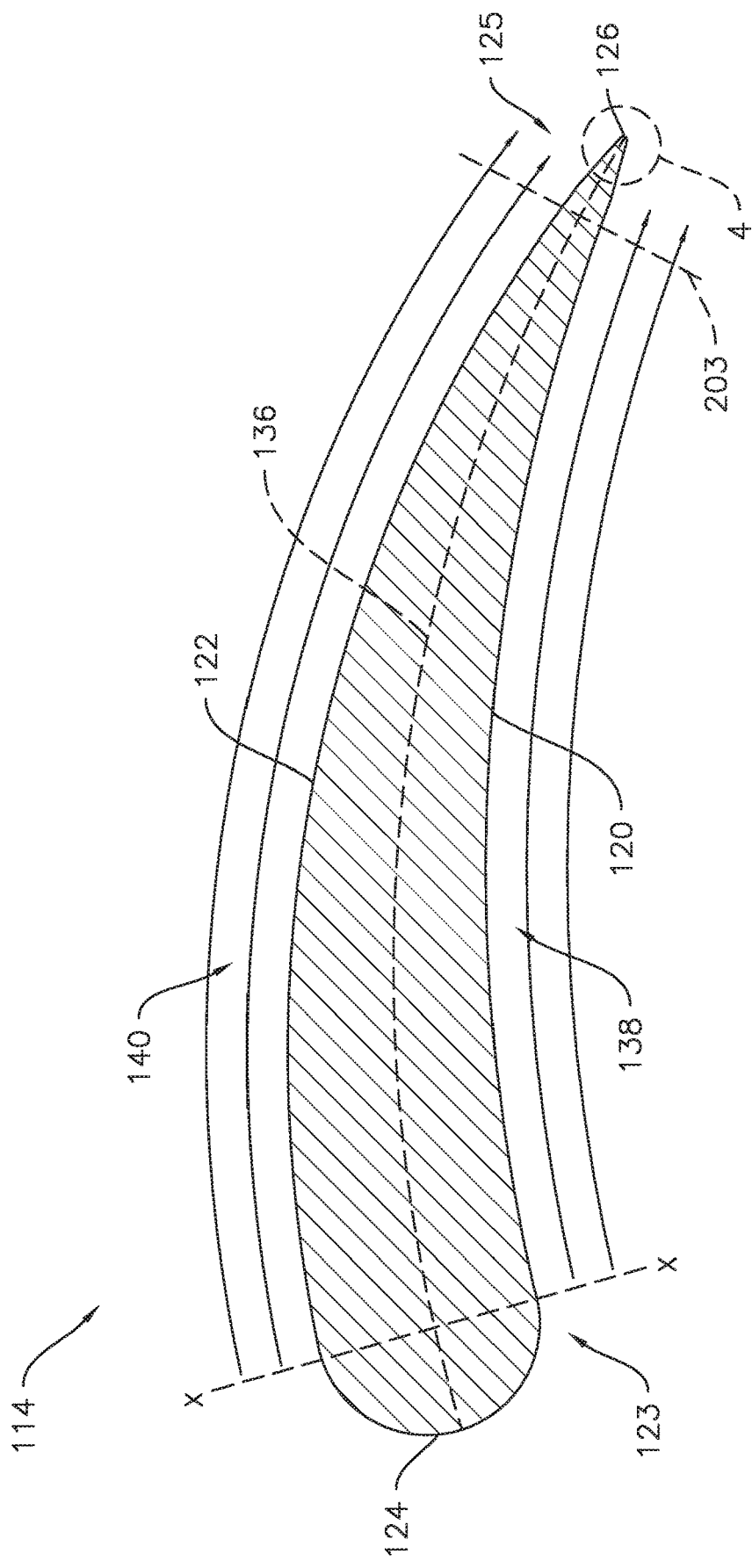
FIG. 3 is a cross-sectional view of the airfoil of FIG. 2, taken along line 3-3 in FIG. 2.

Referring now to FIGS. 2 and 3, the rotor blade 100 further includes an airfoil 114. In particular, the airfoil 114 extends radially outward from the radially outer surface 110 of the platform 108 to a tip 115 with a tip shroud 116 provided at the tip 115. Opposite the tip shroud 116, the airfoil 114 couples to the platform 108 at a root 118 (i.e., the intersection between the airfoil 114 and the platform 108).

The airfoil 114 includes a pressure side surface 120 and an opposing suction side surface 122 (FIG. 3). The pressure side surface 120 and the suction side surface 122 are joined together or interconnected at a leading edge 124 of the airfoil 114, which is oriented into the flow of combustion gases 34 (FIG. 1). The pressure side surface 120 and the suction side surface 122 are also joined together or interconnected at a trailing edge 126 of the airfoil 114 spaced downstream from the leading edge 124. The pressure side surface 120 and the suction side surface 122 are continuous about the leading edge 124 and the trailing edge 126. The pressure side surface 120 is generally concave, and the suction side surface 122 is generally convex.

Referring particularly to FIG. 2, the airfoil 114 defines a span 128 extending from the root 118 to the tip 115. In particular, the root 118 is positioned at zero percent (0%) of the span 128, and the tip 115 is positioned at one hundred percent (100%) of the span 128. As shown in FIG. 2, zero percent (0%) of the span 128 is identified by 130, and one hundred percent (100%) of the span 128 is identified by 132. Furthermore, a point at about ninety percent of the span 126 is identified by 134 and a point at about fifteen percent of the span 126 is identified by 133. Other positions along the span 128 may be defined as well. As mentioned above, "about" is used herein to encompass a range within plus or minus ten percent of the stated value. In the case of a percentage value, the range is intended to include within plus or minus ten percentage points, e.g., about ninety percent may include from eighty percent to one hundred percent and about fifteen percent may include from five percent to twenty-five percent.

Referring now to FIG. 3, the airfoil 114 defines a camber line 136. More specifically, the camber line 136 extends from the leading edge 124 to the trailing edge 126. The camber line 136 is also positioned between and equidistant from the pressure side surface 120 and the suction side surface 122. As shown, the airfoil 114 and, more generally, the rotor blade 100 include a pressure side 138 positioned on one side of the camber line 136 and a suction side 140 positioned on the other side of the camber line 136.

As mentioned above, the rotor blade 100 includes the tip shroud 116. As illustrated in FIG. 2, the tip shroud 116 couples to the radially outer end (e.g., the tip 115) of the airfoil 114 and generally defines the radially outermost portion of the rotor blade 100. Functionally, the tip shroud 116 reduces the amount of the combustion gases 34 (FIG. 1) that escape past the rotor blade 100. In the embodiment shown in FIG. 2, the tip shroud 116 includes a seal rail 152 extending radially outwardly from the radially outer surface 146. Alternate embodiments, however, may include more seal rails 152 (e.g., two seal rails 152, three seal rails 152, etc.) or no seal rails 152 at all.

As may be seen in FIG. 2, the section along line 3-3 is taken through a mid-span portion 156 of the airfoil 114. That is, the span 128 of the airfoil 114 may generally encompass three distinct portions which are distinct at least as to the shape of the aerodynamic surfaces at and around the trailing edge 126, as will be described in more detail below, and line 3-3 is taken through a middle portion of the three portions. The mid-span portion 156 may be defined between points 133 and 134, an inner span portion 154 of the airfoil 114 may be defined from the platform 108 to point 133, and an outer span portion 158 of the airfoil 114 may be defined from point 134 to the tip 115 and/or the tip shroud 116.

The mid-span portion may extend over a majority of the span 128, such as between about two thirds of the span and about three quarters of the span 128. Thus, in some example embodiments, point 133 may be at about twelve and a half percent (12.5%) of the span 128 and point 134 may be at about eighty-seven and a half percent (87.5%) of the span 128 (e.g., where the mid-span portion 156 extends over about seventy-five percent (75%) of the span 128 and where the inner portion 154 and the outer portion 158 are equivalent in span length). In additional example embodiments, point 133 may be at about sixteen and a half percent (16.5%) of the span 128 and point 134 may be at about eighty-three and a half percent (83.5%) of the span 128, e.g., where the mid-span portion 156 of the airfoil 114 extends over about two thirds or sixty-seven percent (67%) of the span 128.

It should be noted that each of the sectional views in FIGS. 3 through 6 is a constant-span section. For example, FIG. 3 may be taken at about fifty percent (50%) of the span 128, and the entirety of the section through the airfoil 114 as shown in FIG. 3 lies at the same position along the span 128, e.g., at about fifty percent (50%) of the span 128. In other words, each of the sectional views in FIGS. 3 through 6 may be taken in a plane perpendicular to the radial direction R.

Figure 4:
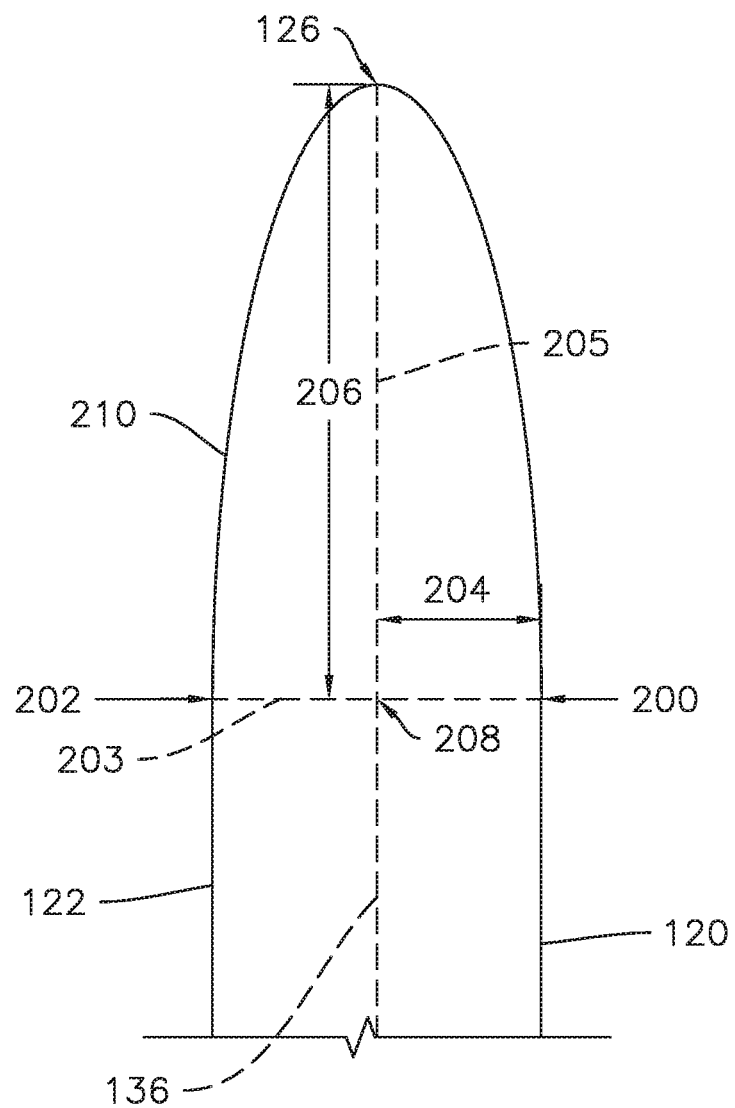
FIG. 4 is an enlarged view of a portion of the airfoil shown in FIG. 3.
Figure 5:
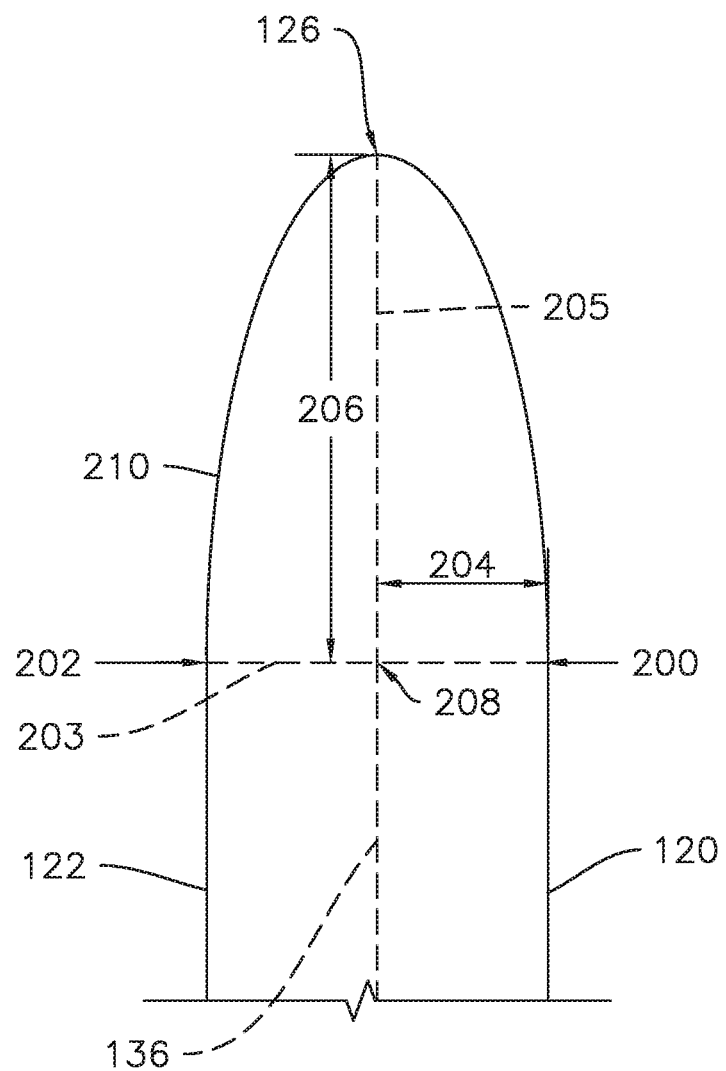
FIG. 5 is a cross-sectional view of a portion of the airfoil of FIG. 2, taken along line 5-5 in FIG. 2.
Figure 6:
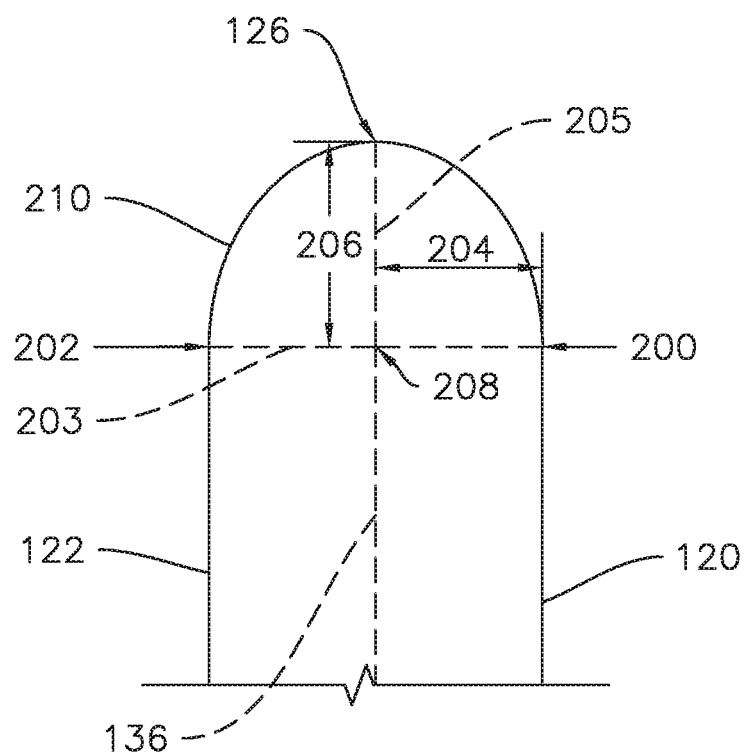
FIG. 6 is a cross-sectional view of a portion of the airfoil of FIG. 2, taken along line 6-6 in FIG. 2.

As may be seen in FIGS. 3 through 6, particularly FIGS. 4 through 6, the portions of pressure side surface 120 and the suction side surface 122 proximate the trailing edge 126 are generally arcuate, e.g., the pressure side surface 120 and the suction side surface 122 collectively define an arc 210 centered at the trailing edge 126. In some embodiments, the arc 210 may be generally circular, e.g., a ratio of a major axis of the arc 210 to a minor axis of the arc 210 may be about one to one (1:1). In other embodiments, the arc 210 may be elliptical, e.g., the major axis may be larger than the minor axis.

In still further example embodiments, the shape of the arc 210, e.g., the ratio of the axes, may vary across the span 128 of the airfoil 114. For example, the arc 210 may be elliptical at and around the middle of the span 128 and may be generally circular or nearly circular at the root 118 and the tip 115, e.g., at about zero percent (0%) and about one hundred percent (100%) of the span 128. For example, the shape of the arc 210 in the mid-span portion 156 may vary from the shape of the arc 210 in the inner span portion 154 and the outer span portion 158, and the shape of the arc 210 may vary within the span portions, such as at least within the inner span portion 154 and the outer span portion 158. Such embodiments may maximize aerodynamic performance by providing the elliptical shape of the arc 210 over the majority of the span 128 while also maximizing durability by providing the circular (or nearly circular) shape of the arc 210 at or around the root 118 and the tip 115/tip shroud 116.

As may be seen in FIGS. 4 through 6, the arc 210 may be centered at the trailing edge 126 and may extend from a first endpoint 202 on the suction side surface 122 to a second endpoint 200 on the pressure side surface 120. The arc 210 may be semi-circular or semi-elliptical. For example, the first end point 202 and the second endpoint 200 may lie at opposite ends of a line segment 203, and the line segment 203 may define a minor diameter (or minor axis) of the arc 210 and/or of the ellipse of which the arc 210 is a segment, e.g., the arc 210 may be one half of an ellipse having major and minor axes of different lengths. The camber line 136 may intersect the minor diameter 203 at a midpoint 208 of the minor diameter 203, the midpoint 203 defining a center of the ellipse.

A semi-major axis 206 of the arc 210 may be defined from the intersection of the camber line 136 and the minor diameter 203, e.g., from the midpoint 208 of the minor diameter 203, to the trailing edge 126, and the semi-major axis 206 may be one half of a major diameter, or major axis, of the ellipse of which the arc 210 is a segment. The semi-major axis 206 may be defined along a major axis 205, which is an extension or portion of the camber line 136 and may be perpendicular to the minor diameter 203. As noted in FIGS. 4 through 6, the minor diameter 203 may define a semi-minor axis 204 (e.g., a minor radius), and the major axis 205 may define a semi-major axis 206.

Turning now specifically to FIG. 4, an elliptical arc 210 is illustrated. It should be noted that FIG. 4 is a portion of FIG. 3, which is taken along the constant-span line 3-3 in FIG. 2, e.g., the section in FIG. 4 is taken in a plane perpendicular to the radial direction R. Thus, it should be understood that the elliptical shape of the arc 210 in the cross-section described herein with reference to FIG. 4 (as well as FIGS. 5 and 6) is an elliptical shape in a constant-span cross-section of the airfoil 114. FIG. 4 depicts the elliptical arc 210, which may be provided in the mid-span portion 156 of the airfoil 114, e.g., between point 133 and point 134 in FIG. 2. As described above, the mid-span portion 156 may extend across between about two thirds and about three quarters of the span 128.

As shown in FIG. 4, the elliptical arc 210 may have an axis ratio of about four to one (4:1). For example, the axis ratio may be a ratio of the semi-major axis 206 to the semi-minor axis 204, such that when the axis ratio is about four to one (4:1), the semi-major axis 206 is about four times the semi-minor axis 204. In various embodiments, the trailing edge arc 210 may have an axis ratio of about two to one (2:1) or higher, such as about three to one (3:1) or higher, throughout the mid-span portion 156 of the airfoil 114.

The arc 210 may maintain the same axis ratio across the entire mid-span portion 156 of the airfoil 114. Thus, the mid-span portion 156 of the airfoil 114 may have a constant axis ratio at the trailing edge 126 and may have a higher axis ratio than the remaining parts of the airfoil 114. The axis ratio of the arc 210 may vary outside of the mid-span portion 156 of the airfoil 114, e.g., may smoothly transition or blend from the high axis ratio shape of FIG. 4 to a generally circular shape having generally equal axes (e.g., "generally" equal means the semi-major axis 206 may be equal to the semi-minor axis 204 or up to ten percent greater than the semi-minor axis 204) or a nearly circular shape where the semi-major axis 206 is up to about twenty-five percent greater than the semi-minor axis 204.

FIGS. 5 and 6 illustrate varying elliptical shapes of the arc 210 in constant-span cross sections taken around the trailing edge 126 as the shape of the arc 210 varies through the outer span portion 158. It should be understood that the variations in the arc 210 at the trailing edge 126 may be generally symmetrical span wise, such that, for example, where FIG. 5 represents a cross-section at point 134 (e.g., 87.5% of the span 128), the same cross-sectional shape would be provided at the trailing edge 126 at point 133 (e.g., 12.5% of the span 128). Thus, the example arcs illustrated in FIGS. 5 and 6 may be provided in both the outer span portion 158 (as indicated in FIG. 2) and in corresponding locations in the inner span portion 154.

FIG. 5 illustrates the cross-section at the beginning of the transition from the highest axis ratio in the mid-span portion 156 to the lowest axis ratio at the root 118 and the tip 115. Thus, the axis ratio at point 134 (FIG. 2), as illustrated in FIG. 5, may be relatively close to the axis ratio in the mid-span portion 156 of the airfoil 114. For example, as illustrated in FIG. 5, the axis ratio may be about three to one (3:1), e.g., the semi-major axis 206 may be about three times the semi-minor axis 204. In various embodiments, the axis ratio at point 134 may be between about one and a half to one (1.5:1) and about three and a half to one (3.5:1), e.g., the semi-major axis 206 may be between about one and a half times and about three and a half time the semi-minor axis 204 in the mid-span portion 156.

FIG. 6 illustrates the shape of the arc 210 in constant-span cross sections taken around the trailing edge 126 at or near an end of the airfoil 114, e.g., at or near one or both of the root 118 and the tip 115 (e.g., at line 6-6 of FIG. 2). In various embodiments, the shape of the arc 210 may approach a circular shape at the ends of the airfoil 114, as mentioned above. Thus, the axis ratio may be about one and a quarter to one (1.25:1), as illustrated in FIG. 6. In various embodiments, the axis ratio at the location illustrated in FIG. 6 may be between about one and a half to one (1.5:1) and about one to one (1:1).

Figure 7:
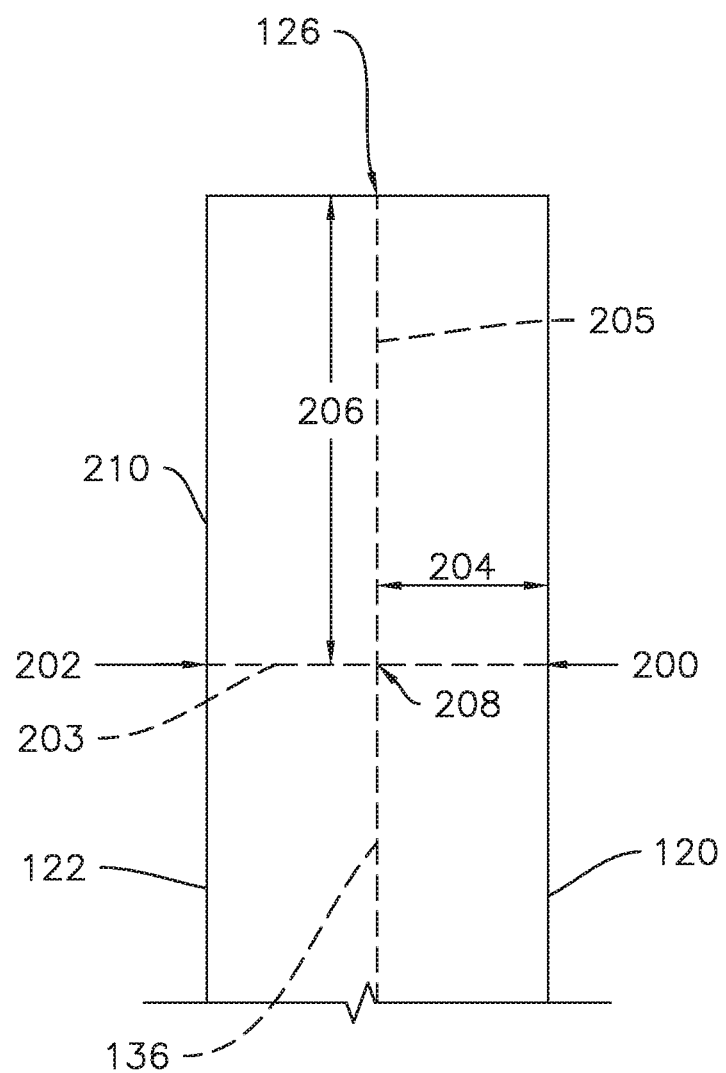
FIG. 7 is a cross-sectional view of a portion of the airfoil of FIG. 2, taken along line 5-5 in FIG. 2, according to one or more additional exemplary embodiments.
Figure 8:
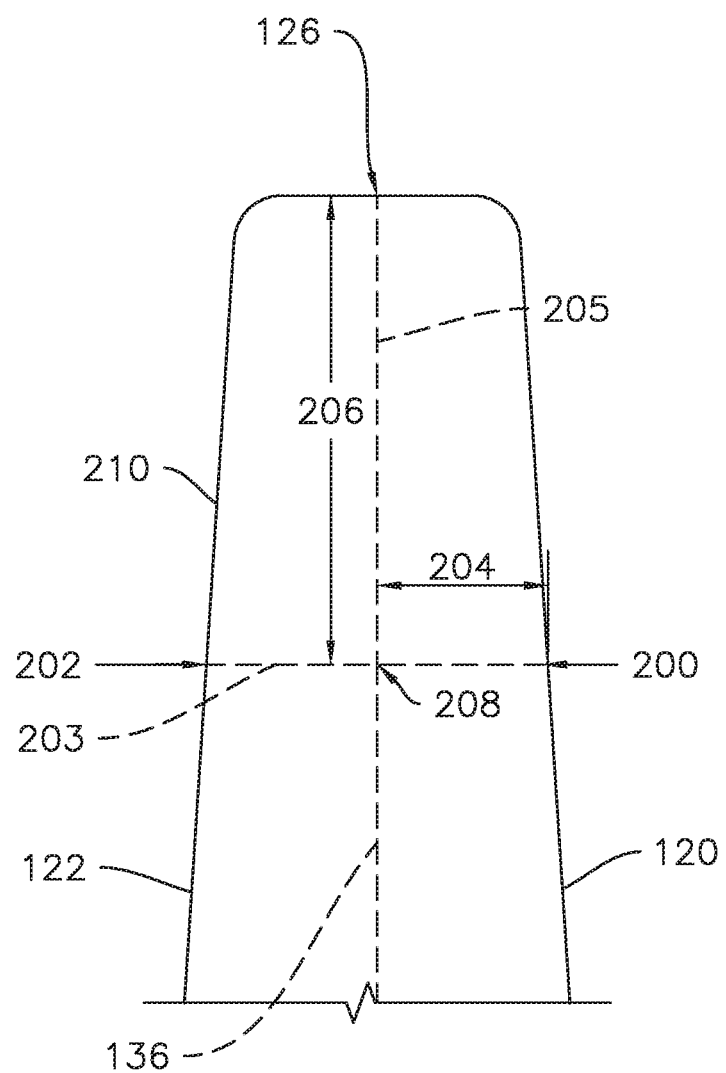
FIG. 8 is a cross-sectional view of a portion of the airfoil of FIG. 2, taken along line 5-5 in FIG. 2, according to one or more further exemplary embodiments Repeat use of reference characters in the present specification and drawings is intended to represent the same or analogous features or elements of the present technology.

In additional embodiments, the trailing edge 126 portion may be square, as illustrated in FIG. 7, or blunt, as illustrated in FIG. 8. FIGS. 7 and 8 each illustrate the shape of the airfoil in constant-span cross sections taken around the trailing edge 126 at or around the mid-span portion 156.

This written description uses examples to disclose the technology, including the best mode, and also to enable any person skilled in the art to practice the technology, including making and using any devices or systems and performing any incorporated methods. The patentable scope of the technology is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An airfoil of a rotor blade for a turbomachine, the airfoil comprising:
   a root;
   a tip spaced radially outward from the root, the root and the tip defining a span of the airfoil therebetween;
   a leading edge extending across the span of the airfoil from the root to the tip;
   a trailing edge downstream of the leading edge along a flow direction, the trailing edge extending across the span of the airfoil from the root to the tip;
   a pressure side surface extending between the root and the tip and extending between the leading edge and the trailing edge;
   a suction side surface extending between the root and the tip and extending between the leading edge and the trailing edge, the suction side surface opposing the pressure side surface, the pressure side surface and the suction side surface continuous about the trailing edge; and
   an arc centered on the trailing edge and collectively defined by a portion of the pressure side surface and a portion of the suction side surface, the arc having a semi-major axis and a semi-minor axis;
   wherein the semi-major axis and the semi-minor axis of the arc define an axis ratio, and the axis ratio varies over the span of the airfoil, wherein the arc is generally circularly shaped at the root and the tip of the airfoil, and wherein the arc is elliptically shaped between the root and the tip of the airfoil.

2. The airfoil of claim 1, wherein the axis ratio is greater at a midpoint of the span than at the root or the tip.

3. The airfoil of claim 1, wherein the axis ratio varies symmetrically across the span.

4. The airfoil of claim 1, wherein the axis ratio is constant over a mid-span portion of the airfoil.

5. The airfoil of claim 4, wherein the mid-span portion of the airfoil comprises about two thirds of the span of the airfoil.

6. The airfoil of claim 1, wherein the axis ratio is greatest in a mid-span portion of the airfoil.

7. The airfoil of claim 6, wherein the axis ratio is constant over the mid-span portion of the airfoil.

8. The airfoil of claim 7, wherein the mid-span portion of the airfoil comprises about two thirds of the span of the airfoil.

9. The airfoil of claim 6, wherein the semi-major axis is about three times the semi-minor axis in the mid-span portion of the airfoil.

10. The airfoil of claim 1, wherein the axis ratio is about one to one (1:1) at the root and at the tip of the airfoil, and wherein the axis ratio is up to about four to one (4:1) between the root and the tip of the airfoil.

11. A turbomachine, comprising:
a compressor;
a combustor disposed downstream from the compressor; and
a turbine disposed downstream from the combustor, the turbine including a rotor shaft extending along an axial direction through the turbine and a rotor blade connected to the rotor shaft, an airfoil of the rotor blade comprising:
a root;
a tip spaced radially outward from the root, the root and the tip defining a span of the airfoil therebetween;
a leading edge extending across the span of the airfoil from the root to the tip;
a trailing edge downstream of the leading edge along a flow direction, the trailing edge extending across the span of the airfoil from the root to the tip;
a pressure side surface extending between the root and the tip and extending between the leading edge and the trailing edge;
a suction side surface extending between the root and the tip and extending between the leading edge and the trailing edge, the suction side surface opposing the pressure side surface, the pressure side surface and the suction side surface continuous about the trailing edge; and
an arc centered on the trailing edge and collectively defined by a portion of the pressure side surface and a portion of the suction side surface, the arc having a semi-major axis and a semi-minor axis;
wherein the semi-major axis and the semi-minor axis of the arc define an axis ratio and the axis ratio varies over the span of the airfoil, wherein the arc is generally circularly shaped at the root and the tip of the airfoil, and wherein the arc is elliptically shaped between the root and the tip of the airfoil.

12. The turbomachine of claim 11, wherein the axis ratio is greater at a midpoint of the span than at the root or the tip.

13. The turbomachine of claim 11, wherein the axis ratio varies symmetrically across the span.

14. The turbomachine of claim 11, wherein the axis ratio is constant over a mid-span portion of the airfoil.

15. The turbomachine of claim 14, wherein the mid-span portion of the airfoil comprises about two thirds of the span of the airfoil.

16. The turbomachine of claim 11, wherein the axis ratio is greatest in a mid-span portion of the airfoil.

17. The turbomachine of claim 16, wherein the axis ratio is constant over the mid-span portion of the airfoil.

18. The turbomachine of claim 17, wherein the mid-span portion of the airfoil comprises about two thirds of the span of the airfoil.

19. The turbomachine of claim 16, wherein the semi-major axis is about three times the semi-minor axis in the mid-span portion of the airfoil.

20. The turbomachine of claim 11, wherein the axis ratio is about one to one (1:1) at the root and at the tip of the airfoil, and wherein the axis ratio is up to about four to one (4:1) between the root and the tip of the airfoil.

\* \* \* \* \*